United States Patent [19]

Davis et al.

[11] 4,366,977
[45] Jan. 4, 1983

[54] PARTITION FOR A CARGO TRANSPORTER

[75] Inventors: Philip W. Davis, Bristol; Hendrik J. Buzink, Kidderminster, both of England

[73] Assignee: Avon Industrial Polymers (Melksham) Ltd., Melksham, England

[21] Appl. No.: 201,532

[22] Filed: Oct. 28, 1980

[30] Foreign Application Priority Data

Nov. 1, 1979 [GB] United Kingdom ............... 7937907

[51] Int. Cl.³ ........................................... B62D 33/04
[52] U.S. Cl. .................................. 296/24 R; 296/24 B; 410/119; 49/477
[58] Field of Search ................. 296/24 B, 24 R, 37.6; 410/119; 49/466, 477, 34, 70, 463, 465; 160/90

[56] References Cited

U.S. PATENT DOCUMENTS

| 2,674,206 | 4/1954 | Scott | 410/119 |
| 2,782,846 | 2/1957 | Bussard | 296/24 B |
| 2,856,867 | 10/1958 | Dasey | 410/119 |
| 3,311,042 | 3/1967 | Severson | 49/477 |
| 3,376,599 | 4/1968 | Singer | 296/24 R |
| 4,049,311 | 9/1977 | Dietrich et al. | 410/134 |
| 4,221,421 | 9/1980 | Bettker et al. | 296/24 B |

FOREIGN PATENT DOCUMENTS 1574124  7/1969  France .

Primary Examiner—Robert R. Song

[57] ABSTRACT

A removable and movable partition (10) for dividing up the interior of a cargo transporter has a boundary made up of mutually perpendicular inflatable tube sections (11,13,15,17) which rigidify upon inflation and urge themselves tightly into contact with the walls floor and ceiling respectively of the transporter. The inflation of the tubes also tensions between them a double dividing wall (33), of two parallel sheets of flexible material which are respectively secured tangentially to the tubes, and which may have a flap (39) for access to inflation/deflation valves (25,27). Shaped spacer means may be interposed between the tube(s) and floor and ceiling if they are corrugated or otherwise interrupted.

9 Claims, 5 Drawing Figures

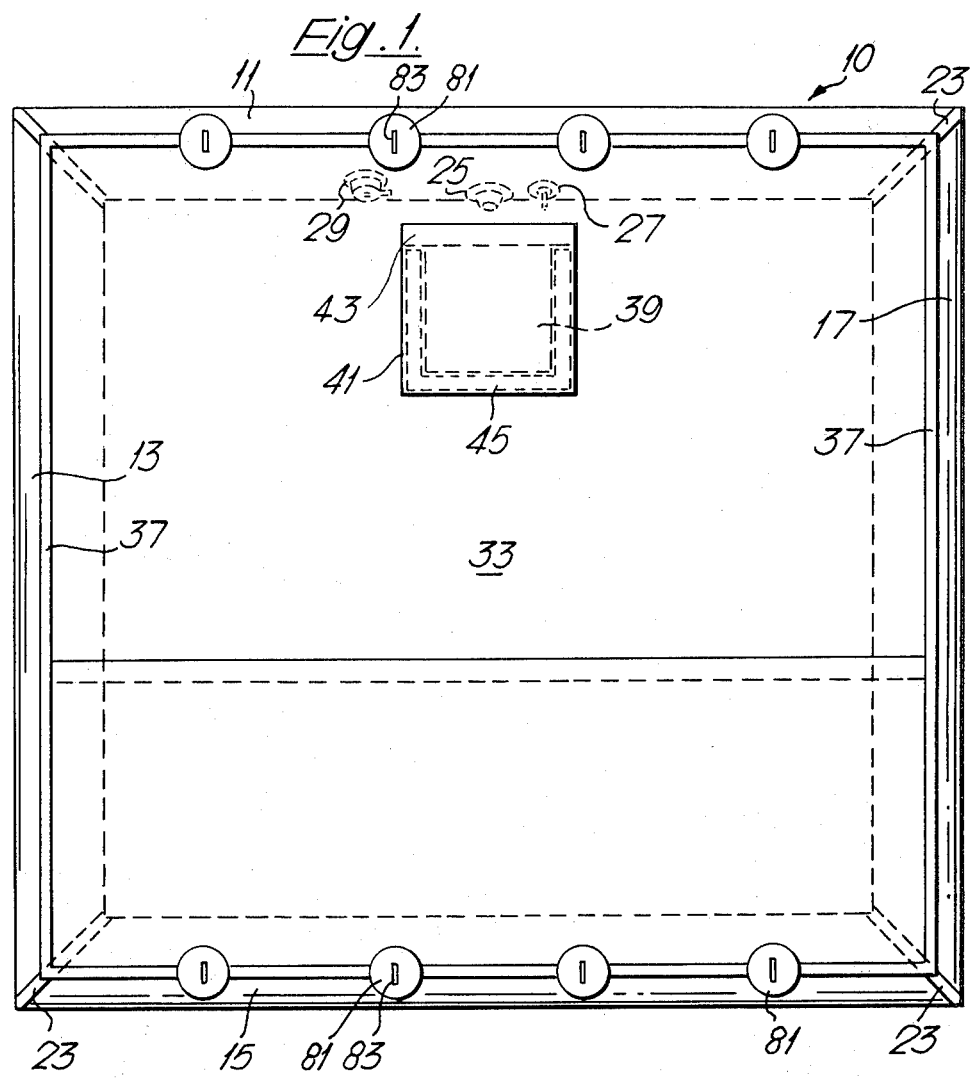
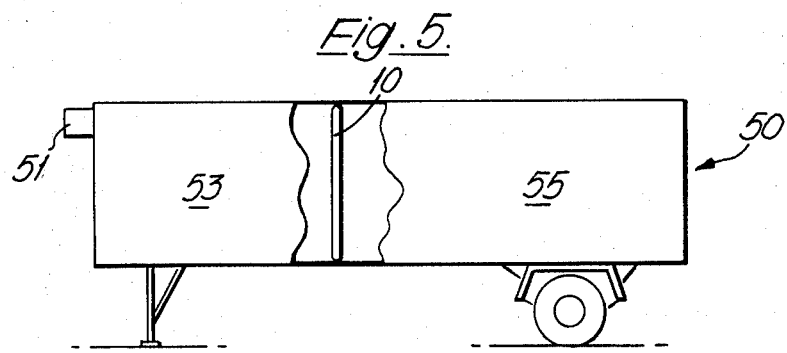

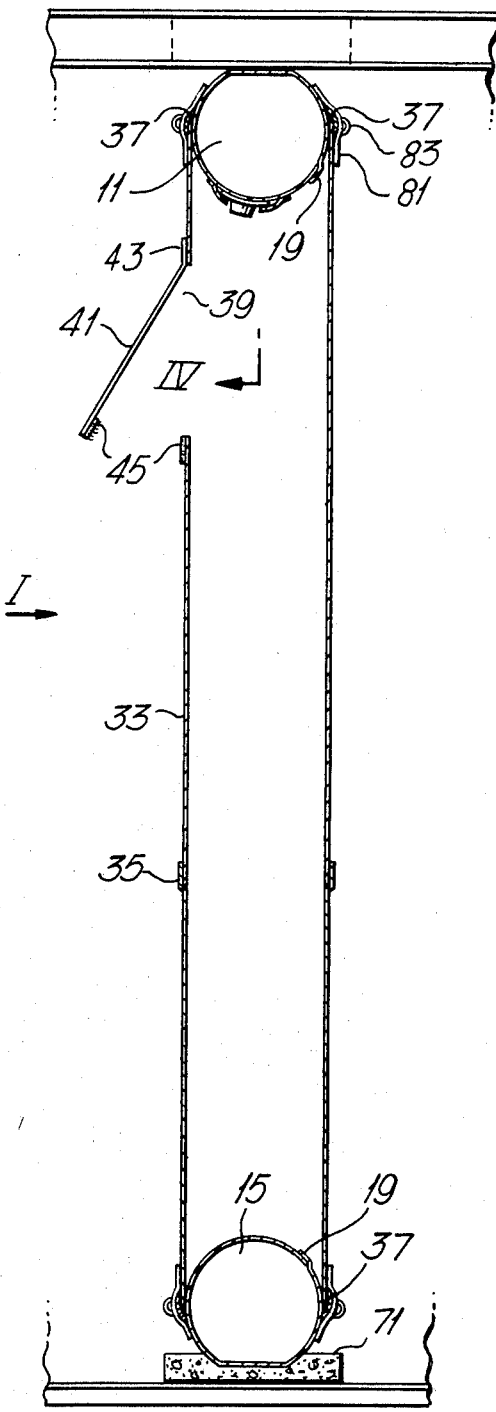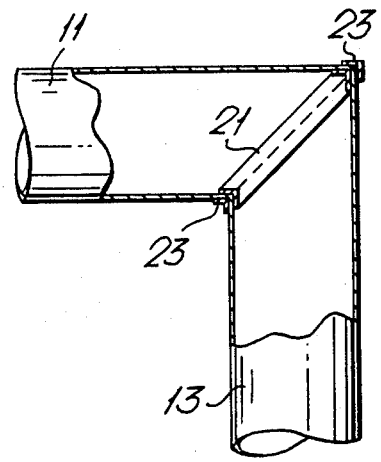

PARTITION FOR A CARGO TRANSPORTER

FIELD OF THE INVENTION

This invention relates to partitions for the temporary and adjustable subdivision of a volume used for cargo transportation. The volume concerned is the interior of a road or other freight vehicle, a freight container or the like.

BACKGROUND OF THE INVENTION

The efficient use of energy is nowadays a major concern. In the field of cargo transportation two particular economies can be identified; in the maximization of the use of space, and in the case of refrigerated or otherwise conditioned atmospheres in the vehicle the application of conditioning only to the minimum necessary volume.

Permanent partitions sub-dividing the interior are not effective if the size of loads or their make-up is not constant, and they will make loading and unloading more difficult.

SUMMARY OF THE INVENTION

We therefore propose a temporary and entirely removable partition.

To achieve a seal substantially preventing airflow between the parts of the interior separated by the partition, its boundaries are formed by one or more inflatable tubes. When inflated these will press against the floor ceiling and walls of the interior (or against spacer pieces provided) and at the same time maintain the partition in position and form a substantial seal. The inflatability means also that any slight irregularities or distortion in these walls, etc. will be accommodated.

It is commonplace for road vehicles and containers to have longitudinally corrugated floors. To achieve an efficient seal here a spacer piece will be provided which is a strip of which one surface is corrugated to correspond to the floor while the opposite surface is plane or may have a shallow recess in it, to be borne against or to receive the tubular portions, of the partition. Similarly a spacer piece or pieces will be provided if the roof is corrugated or is interrupted by longitudinal beams.

To allow access to between the walls of a double-walled partition there may be a closable flap in it.

In a preferred form, the partition comprises an inflatable structure formed from flexible sheet material the periphery of the partition being formed by four inflatable tubular portions connected together to form an inflatable rectangular frame, and two sheets of flexible material extending between the tubular portions within the rectangular space framed by them.

DESCRIPTION OF THE DRAWINGS

A partition embodying the invention will now be described with reference to the accompanying diagrammatic drawings, in which FIG. 1 is an elevational view of the partition, looking in the direction of the arrow I of FIG. 3;

FIG. 3 is a cross section on line III—III of FIG. 2;

FIG. 4 is a detail view partially in section on the line IV—IV of FIG. 3; and

FIG. 5 is a schematic view of a vehicle semi-trailer showing possible use of the partition.

DESCRIPTION OF THE PREFERRED EMBODIMENT

Figure 2:
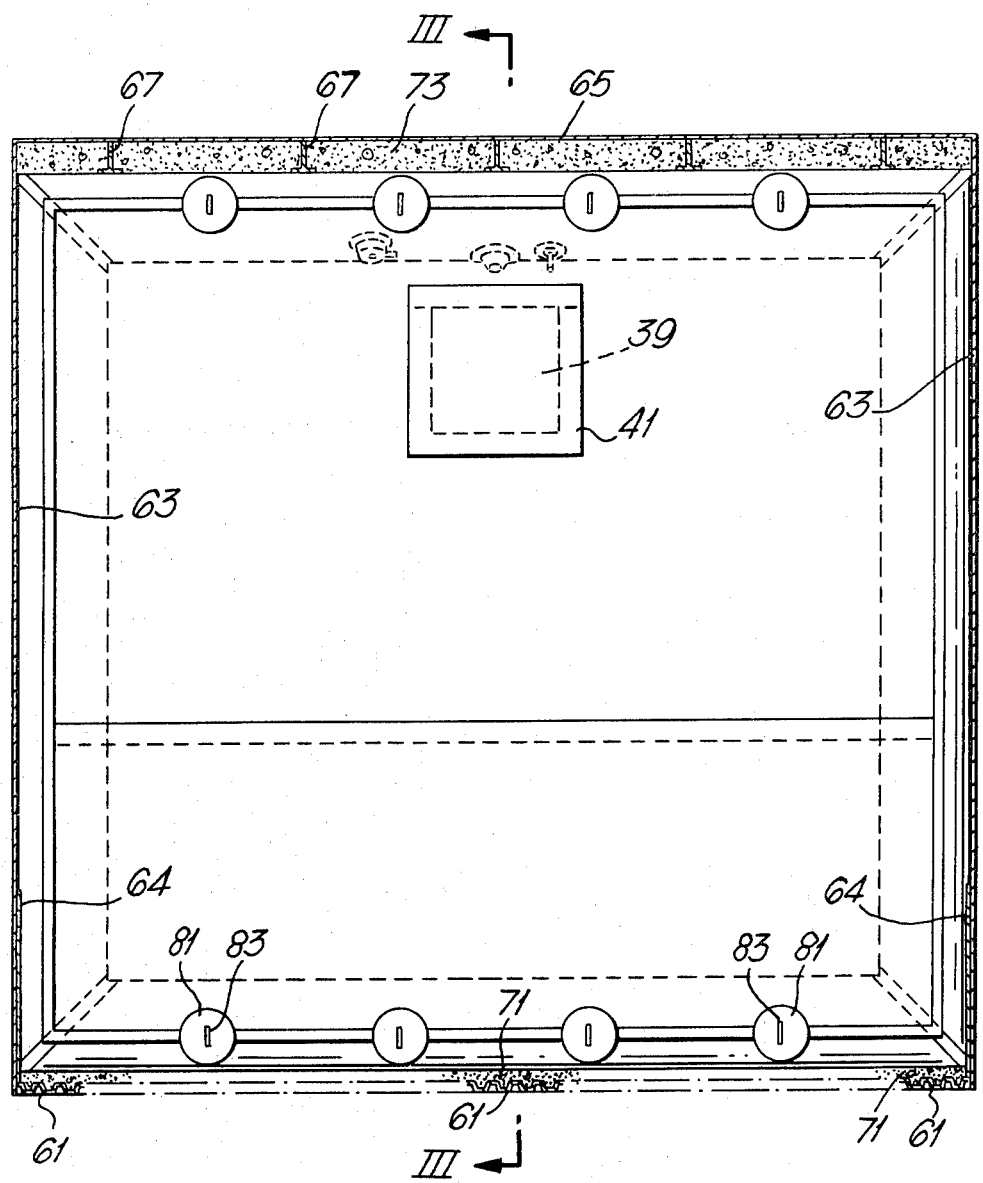
FIG. 2 is a similar view, but showing the partition in place in a container or truck body.

The partition 10 has a rectangular peripheral "frame" formed from four tubular sections 11, 13, 15, 17 joined at mitred right angle corners to form a continuous tube. Each tube section is formed from flexible sheet material with a longitudinal join 19 (FIG. 3). It is preferred that the tube sections are joined by a technique in which the sheet material of adjacent sections is bonded to opposite sides of a tube of material 21 sleeved onto a laminar former. After the join has been made the tube of material 21 is slit or parted along one edge of the former and forms a tape inside a mitred corner as shown in FIG. 4. The outside of the corner joins are then covered with a protective strip 23.

The tube section 11 is fitted with a valve 25 for inflation by means of a compressed airline, a Schrader valve 27 for inflation by means of a foot pump or similar in the event that an air line is not available and a pressure relief valve 29 to prevent over-inflation.

Because the frame has sections running in both horizontal and vertical directions, inflation of it causes the frame to acquire rigidity in both of these perpendicular directions.

The space within the frame 11–17 is closed by means of a pair of diaphragms 31,33 each formed from sheet material. The diaphragm 31 is, for convenience, made from two pieces of sheet material overlapped and bonded together at 35. It is bonded to the peripheral tube sections 11,13,15,17 so as to extend tangentially from each of them and the joins to the tube sections are covered over by means of a protective strip 37.

The second diaphragm 33 is generally similar to the diaphragm 31 but has an aperture 39 in its upper part which is covered over by a flap 41 with its upper edge 43 bonded to the diaphragm. This flap provides access to the valves 25,27,29 and when not in use is releasably attached to the diaphragm 33 by means of strips of Velcro 45 on the free edges of the flap 41 and the corresponding edges of the aperture 39.

The same type of sheet material is used to form both the tube sections 11–17 and the diaphragms 31,33 (although conceivably different materials could be used). The material is a textile fabric coated with a thermally-cured elastomer, and this is also used for the protective strips 23,37 and the flap 41. The partition is formed entirely by a cold bonded construction; that is to say the various parts are assembled together by bonding at ambient temperature with a suitable adhesive e.g. Bostik 2402. The diaphragms 31 and 33 are dimensioned so that when the peripheral tube of the partition has been inflated the diaphragms are stretched but are not under any substantial tension.

Normal inflation pressure is 3 p.s.i. and the valve 29 is set to blow off at 5 p.s.i.

As shown in FIG. 5, the partition is intended to be positioned transversely across the interior of a closed freight vehicle e.g. an articulated lorry semi-trailer 50 having a box body as shown in FIG. 5 although the partition could equally be used in other types of vehicle or in freight containers. The partition 10 serves to divide the freight vehicle into separate compartments. One envisaged use would be for a vehicle fitted with a refrigeration unit 51. By partitioning the body into compartments 53 and 55 the refrigeration unit 51 would operate to chill only the forward compartment 53, producing economy if there was only a partial load of freight requiring refrigeration (which would be packed in the compartment 53 before the partition was put in place). It would then be possible to pack freight which did not require refrigeration in the rearward part 55 of the body if desired. An alternative use which is envisaged would be to divide a vehicle body so that foodstuffs could be carried in one of the two compartments 53,55 while carrying in the other of the two parts of the vehicle body, freight which cannot normally be carried in the same vehicle as foodstuffs.

In the example shown in FIGS. 2 and 3 the vehicle body has a corrugated floor 61, side walls 63 with plates 64 protecting their lower portions, and a roof 65 with beams 67 extending longitudinally beneath the roof 65. A spacer member 71 is placed across the floor of the vehicle body. This spacer member is formed from foamed plastics material and is shaped to fit into the spaces between the corrugations and to provide a shallow recess which the partition can seat—shown in FIG. 3. A plurality of spacer members 73, also made of foam material, are placed between the beams 67 so as to provide a flat ceiling surface against which the upper tube section 11 can bear.

As mentioned, inflation of the peripheral frame of the partition causes it is acquire rigidity. Moreover, the partition is dimensioned so that if inflated in the open air it would have a lateral width slightly greater than the width between the walls 63 of the vehicle body in which it is to be used and a height slightly greater than the free height between the spacer members 71 and 73. Accordingly, when the partition is inflated within the vehicle body it presses against the walls 63 of the vehicle and against the spacer members 71, 73 which are in turn pressed against the floor 61 and roof 65, and in this way a seal is formed in the two compartments 55,57 of the vehicle.

If desired, patches 81 with D rings 83 secured thereto may be bonded to the partition as shown and used to lash it in place after inflation. However, it is envisaged that the pressure of the partition against the sides 61 and the spacer members 71, 73 will be sufficient to hold it in place without lashing being required.

In the examples shown in the drawings the internal width of the freight vehicle is 2260 mm and the partition would inflate in free air to a width of 2300 mm. The vertical height of the vehicle is 2220 mm which is reduced somewhat by the beams 67 and the spacer member 71 across the floor so that the free height between the spacer members 71 and 73 (level with the beams 67) is 2120 mm whereas the partition would, if inflated in the open air, have a vertical height of 2145 mm. It will be appreciated that the spacer member 71 not only serves to even out the corrugations in the floor of the vehicle but also keeps the lower tubular section 15 off the floor and thus helps to protect it from accidental puncture.

Various modifications are of course possible. It is envisaged that instead of an elastomer coated fabric it might be possible to use a thermoplastic coated fabric in which case the various joins between pieces of material might be formed by any appropriate technique e.g. high frequency welding. It is not essential to provide two diaphragms 31, 33. A single diaphragm could be used although provision of two diaphragms gives better thermal insulation between two parts 53, 55 of the vehicle. If desired the or each diaphragm could incorporate a door formed by a flap closed with Velcro strips in a similar manner to the flap 41 but large enough to allow access from one part of the vehicle to the other. To provide still further improved thermal insulation, insulating material could be placed in the cavity between the diaphragms 31, 33 or this cavity subdivided to restrict circulation of air within it.

It will be appreciated that the partition described hereinbefore can be positioned at any point down the length of a freight vehicle having a body of uniform cross section as is typically used for boxes, crates, parcels and like solid freight. It does not require any fittings permanently attached to the vehicle body and when in position completely closes off the two parts of the body from each other.

We claim:

1. In combination, a transport means having a hollow body for cargo transportation and a partition for removably and adjustably dividing said body into compartments, the body being of substantially rectangular cross-section, the partition comprising a boundary having mututally perpendicular tubular portions and two dividing sheets extending to said boundary, said tubular portions being made substantially entirely of flexible material; and, means for inflating at least said tubular portions of the partition, whereby by expansion of said tubular portions upon inflation, the partition is retained in and by the body at a predetermined position along its length with the two dividing sheet being spaced apart to extend between said tubular portions and form an efficient thermal barrier between the compartments of the body.

2. The combination as claimed in claim 1 further comprising at least one spacer member interposed between an interrupted internal surface of the body and one of said tubular portions, one face of said spacer member shaped to conform to the said interrupted surface and a face opposed to the one face adapted for receiving said one tubular portion in continuous contact.

3. The combination as claimed in claim 1 wherein the dividing sheets extend substantially planar upon inflation of said tubular portions of said boundary.

4. The combination as claimed in claim 3 wherein the body includes refrigeration means at one position thereof, whereby the partition divides the body into refrigerated and a non-refrigerated compartments.

5. A partition for removably and adjustably dividing the interior volume of a rectangular-cross-section body of a cargo transport means, the partition being of rectangular outline, the dimensions of rectangular outline of the partition and of the cross-section of the body corresponding generally and the partition comprising:

(1) a tubular portion of flexible material, along adjacent edges of said outline, (2) valve means for admitting gas under pressure to the said tubular portions, (3) two dividing sheets extending to said tubular portions, said dividing sheets being made of flexible material, whereby the partition is adapted upon inflation of the tubular portions to become engaged with and divide across the body at a position along the body selected for a most efficient utilization of the body volume as a whole with the two dividing sheets forming an air gap between them and upon deflation to collapse into a compact volume.

6. A partition claimed in claim 5 wherein the tubular portions are provided along each edge of the partition.

7. A partition as claimed in claim 6 wherein the dividing sheets are sealed to the tubular portions along zones at respectively opposite ends of one diameter of the tubular portions whereby upon inflation and rigidification of the tube sections, the sheets extend parallel and spaced apart from each other.

8. A partition as claimed in claim 7 wherein at least one sheet comprises a flap for giving access to between the sheets.

9. A partition as claimed in claim 6 wherein said tubular portions are joined together at each corner of the outline by respective mitre joints.

* * * * *

UNITED STATES PATENT AND TRADEMARK OFFICE
CERTIFICATE OF CORRECTION

PATENT NO. : 4,366,977
DATED : January 4, 1983
INVENTOR(S) : Philip W. Davis et al It is certified that error appears in the above-identified patent and that said Letters Patent are hereby corrected as shown below:

On the title page Assignee should read:

-- [73] Assignee : AVON INDUSTRIAL POLYMERS LIMITED --.

Signed and Sealed this

Twenty-fifth Day of October 1983

[SEAL]

Attest:

GERALD J. MOSSINGHOFF

Attesting Officer

Commissioner of Patents and Trademarks